Aug. 24, 1965  D. L. SIMPSON  3,202,014
VEHICLE SPEED CONTROL AND BRAKING APPARATUS
Filed Sept. 13, 1961
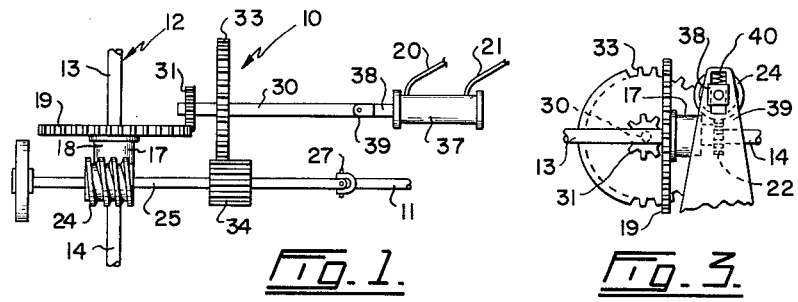
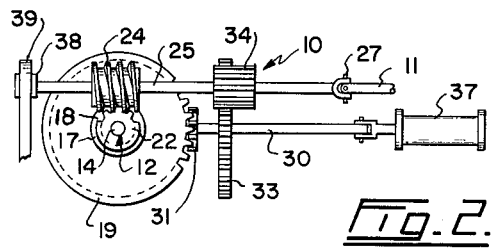
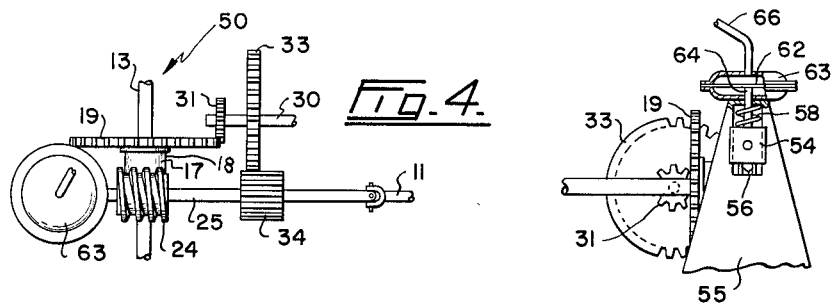
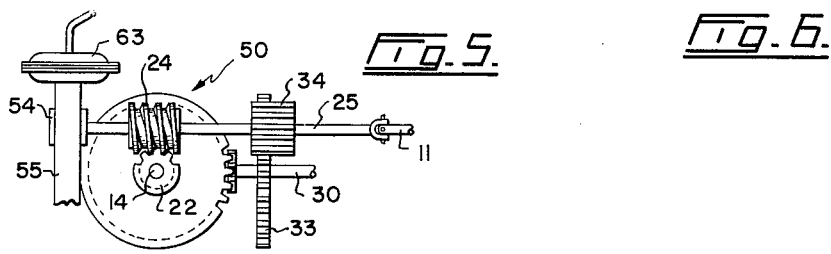
INVENTOR
DARWIN L. SIMPSON
BY
Featherstonhaugh & Co.
ATTORNEYS

3,202,014
VEHICLE SPEED CONTROL AND BRAKING APPARATUS
Darwin L. Simpson, 1243 Strathmore Ave., Nanaimo, British Columbia, Canada
Filed Sept. 13, 1961, Ser. No. 137,920
13 Claims. (Cl. 74—664)

This invention relates to apparatus for controlling the speed of vehicles, such as automobiles, trucks, buses and the like, either driving or backing down hills, and braking said vehicles without the necessity of using their normal braking systems.

An object of the present invention is the provision of apparatus for braking and controlling the speed of movement of vehicles without the necessity of using standard brakes.

Another object is the provision of apparatus for controlling the speed of vehicles, particularly on hills, by utilizing the speed of the engines of the vehicles without putting load on such engines as when transmissions are shifted down into lower gears.

Another object is the provision of apparatus for decelerating vehicles that may be brought into operation only when desired.

Another object is the provision of vehicle speed control and braking apparatus that does not interfere with the speed of the vehicle.

Yet another object is the provision of reliable apparatus for controlling the speed of vehicles on hills and for acting as a holding brake on inclines.

A further object is the provision of apparatus by means of which the speed of a vehicle moving down a hill may be positively controlled by means of the vehicle engine without relying on the compression of the latter to produce a braking effect.

When this speed control and braking apparatus is in operation, the driving wheels of the vehicle cannot travel faster than the engine. As a result of this, if the vehicle is travelling down a hill, at which time the back wheels tend to drive the engine, the speed of the vehicle may be decreased or increased by reducing or increasing the speed of the engine. The apparatus comes into effect automatically when the wheels start to drive the engine, unless the apparatus has been set at an inoperative position. When the engine is stopped or the transmission is out of gear, the back wheels of the vehicle cannot turn and so the apparatus acts as a parking brake.

When a heavy vehicle having only a conventional differential or a worm gear rear end arrangement between the driving shaft and the rear axle travels down hill, it is frequently necessary to change into a lower gear in order to assist the brakes in preventing the vehicle from travelling too fast. When the driver takes his foot off the accelerator when going down a hill, the rear wheels drive the engine, resulting in the speed of the engine under the action of the rear wheels increasing so that the driver still has to use his conventional brakes. This often results in the brakes being applied for comparatively long periods, particularly with heavy loads, to control the speed of the vehicle down the hill. Consequently, the brake bands wear out very quickly and, owing to heating conditions, often results in the brakes becoming practically useless for a time at least. If brake failure occurs while descending a long steep hill, the driver loses all control of the vehicle. Furthermore, failure of the standard hand brake often permits vehicles parked on hills to roll back down said hills.

The present apparatus overcomes these difficulties primarily by the utilization of a worm driving connection between the vehicle drive shaft and axle, said train including a worm wheel on the axle and a worm gear on the driving shaft in mesh with said wheel. The pitch of the worm wheel and gear is such that the wheel cannot drive the gear or, in other words, the axle cannot turn unless the driving shaft is turning. Thus, by controlling the speed of rotation of the driving shaft through the engine, you control the speed of the rear axle. However, if during the travel of the vehicle down a steep hill, the shaft stops turning, the worm wheel and/or worm gear would be stripped. In order to eliminate this possibility, means has been provided for rendering the worm driving connection ineffective.

Vehicle speed control and braking apparatus according to the present invention comprises a worm driving connection including a worm wheel on a normally-driven axle means and a worm gear on a driving shaft and meshing with the worm wheel, the pitch of the worm wheel and gear being such that the wheel cannot drive the gear, said shaft being adapted to be connected to a motor for rotating the axle means, the speed of rotation of the axle means being governed by the speed of rotation of said driving shaft, and means for rendering said worm driving connection ineffective.

Examples of this invention are illustrated in the accompanying drawings, in which, FIGURE 1 is a diagrammatic plan view of one form of control and braking apparatus, FIGURE 2 is a side elevation of the apparatus of FIGURE 1, FIGURE 3 is an end view of said apparatus, FIGURE 4 is a plan view of another form of control and braking apparatus, FIGURE 5 is a side elevation of the apparatus of FIGURE 4, and FIGURE 6 is an end view of the apparatus of FIGURE 4.

Referring to FIGURES 1 to 3 of the drawings, the control and braking apparatus 10 is incorporated in a motor vehicle between the drive shaft 11 and axle means 12 thereof. In this example, axle means 12 includes axles 13 and 14 extending into the case of a standard automobile differential 17. The usual crown gear 19 is secured to differential 17 having the usual housing 18 with standard differential gears inside it. It will be understood that any axle arrangement and standard driving means therefor may be used. As is well known with the standard differential, when crown gear 19 is rotated, axles 13 and 14 normally rotate together, but if the speed of rotation of one axle is slowed down, the other rotates at a higher speed, and vice versa.

Apparatus 10 includes a worm wheel 22 freely mounted on axle 14 and fixedly connected to differential 17 to rotate therewith. A worm gear 24 is mounted on a shaft 25 above worm wheel 22 and meshes with the latter. Shaft 25 is connected to drive shaft 11 of the vehicle in any suitable manner, such as by means of a universal joint 27. The pitch of the worm wheel and worm gear is very fine and is such that the wheel cannot drive the gear.

An idler shaft 30 mounted for longitudinal movement in any convenient manner extends parallel to shaft 25 and has a pinion 31 fixedly mounted on an end thereof adapted to mesh with crown gear 19. A gear 33 is fixedly mounted on idler shaft 30 and meshes with another gear 34 fixedly mounted on shaft 25 which is actually a continuation of drive shaft 11 of the vehicle. Suitable means is provided for shifting idler shaft 30 longitudinally back and forth sufficiently to move pinion 31 out of and into mesh with crown gear 19. In this example, a fluid cylinder 37 is provided for this purpose. This cylinder has a piston rod 38 projecting from an end thereof and connected to shaft 30 at 39. Control pipes 20 and 21 are connected to opposite ends of cylinder 37 and extend to suitable control means, not shown, located near the driver's seat of the vehicle.

Worm wheel 22 and worm gear 24 form a worm driving connection between the drive shafts 11–25 and the vehicle axle 13–14. Gears 19, 31, 33 and 34 form a gear train between the drive shafts and the axles. Shaft 30 may be shifted to disengage pinion 31 from crown gear 19 to break or interrupt this gear train.

When control apparatus 10 is in operation, pinion 31 is out of mesh with crown gear 19, and power is applied to the rear axles through worm gear 24 and worm wheel 22. This connection functions normally if the engine of the vehicle keeps drive shaft 11–25 turning faster than the wheels, that is, the drive shaft is driving the wheels. If the vehicle starts down a hill, the slowing of the engine speed will slow down the speed of rotation of the driving wheels since the latter cannot turn faster than the engine because of the fact that worm wheel 22 cannot drive worm gear 24. Theoretically, if worm gear 24 stopped turning, the driving wheels would stop turning since worm wheel 22 cannot drive gear 24. However, when the vehicle engine turns worm gear 24, the wheels can rotate up to the speed allowed by the revolutions of gear 24. On a down grade with the engine running slowly, the wheels try to rotate worm wheel 22, but worm gear 24 resists this. Therefore, if the driver of the vehicle accelerates, the speed of gear 24 is increased, allowing the wheel to turn faster. On the other hand, if he decelerates, gear 24 slows down and thereby slows down the driving wheels of the vehicle. Thus, by decelerating or accelerating, the driver controls the speed of the vehicle down the hill without the necessity of using his standard brakes. Furthermore, it is the worm drive 22–24 that retards the speed of the driving wheels on a down grade and not the compression of the vehicle engine.

If the engine were to stop or the drive shaft 11 were to be disconnected by the transmission from the engine and the force of the vehicle down a hill were very great, there would be danger of wheel 22 and gear 24 being stripped. It is possible, however, to make the angles of the sides of the teeth of these two elements such that when they are subjected to a high degree of overload, the worm gear will be forced out of mesh with the worm wheel in order to protect the teeth. This would nullify the braking effect of the apparatus, but it would not be any worse than if the teeth of the meshing elements were stripped. In order to allow for this, the end of shaft 25 would need to be mounted for a limited degree of vertical movement under excessive force. For example, the end of shaft 25 may be mounted in a bearing block 38 slidably mounted in a frame 39 and held in its normal operating position by a spring 40 having a tension which will allow shaft 25 to move upwardly only under a predetermined degree of force.

If the vehicle is left on a hill, apparatus 10 may be put into operation by disengaging gear 31 from gear 19. At this time, axles 13 and 14 cannot rotate since worm wheel 22 is in mesh with worm gear 24 so that the vehicle is firmly held on a hill without using its ordinary braking system.

During normal operation of the vehicle, it is desirable to keep apparatus 10 out of operation. At this time, cylinder 37 is operated to move shaft 30 to bring pinion 31 into engagement with crown gear 19, as shown in FIGURES 1 and 2. With this setting, if the axles travel faster than the engine, shaft 25 is rotated through gears 19, 31, 33 and 34, so that worm gear 24 is kept rotating and there is no braking effect. In other words, this gear train rotates gear 24 at such a speed as to allow worm wheel 22 to be rotated by the driving wheels regardless of the speed of the vehicle. The worm driving connection and the gear train have the same ratio so that the driving shaft turns the axles or the axles turn the driving shaft through said worm driving connection and gear train. At this moment, the gear train renders the worm driving connection ineffective, that is, it does not create any braking action. With control apparatus 10 inoperative for braking purposes in this manner, the vehicle functions in its normal manner.

FIGURES 4 to 6 illustrate an alternative form of control and braking apparatus 50 which includes all of the elements of apparatus 10, excepting cylinder 37 for idler shaft 30 and bearing block 38 with its associated parts for drive shaft 25. Shaft 30 is not mounted for longitudinal movement so that pinion 31 is always in mesh with crown gear 19.

Suitable means is provided for shifting the outer end of shaft 25 up and down to a limited degree to alter the degree of mesh between worm wheel 22 and worm gear 24. For example, the end of shaft 25 may be journalled in a bearing block 54 slidably mounted in a frame 55 and urged downwardly against stops 56 by a spring 58. Suitable means is provided for lifting block 54 and, consequently, shaft 55, and this may be done by means of a diaphragm 62 in a suitable capsule 63. A connecting rod 64 is connected to and extends downwardly from the diaphragm out of the capsule and is connected to block 54. A suction line 66 is connected to the capsule above the diaphragm, and extends to suitable control means, not shown, near the driver's seat of the vehicle.

When control apparatus 50 is in operation, that is, it is set to act as brake means, the clearance between the teeth of worm wheel 22 and gear 24 is less than the clearance between the teeth of gears 33 and 34. At this time, bearing block 54 is in its normal position. If axle 12–14 tends to run faster than the vehicle engine or driving shaft 11, worm wheel 22 and gear 24 meshes before gears 33 and 34 so that the worm wheel attempts to drive or rotate the worm gear, and this cannot be done. Therefore, the apparatus tends to brake the vehicle, and the speed of the latter is controlled by the speed of the engine without relying upon the compression of the latter or using the standard braking system of the vehicle. Apparatus 50 is made inoperative by operating diaphragm 62 to lift bearing block 54 and the end of driving shaft 25. This increases the clearance between worm wheel 22 and worm gear 24 until it is greater than that between the teeth of gears 33 and 34. At this time, the axles can drive the driving shaft through the gear train or said driving shaft can drive the axles through the train. In other words, the worm driving connection is rendered ineffective.

The basic idea in this control and braking apparatus is the utilization of a worm wheel and worm gear of such fine pitch that the wheel cannot drive or rotate the gear. This forms a worm driving connection between the vehicle wheels and the driving or power shaft of the vehicle so that the engine of the latter may be used to control the speed of the vehicle down hill without relying on the compression of the engine or the normal braking system. However, there are times when this particular control is not necessary or desirable, and the apparatus includes means for rendering the worm driving connection ineffective. In the embodiment of FIGURES 1 to 3, the worm driving connection is rendered ineffective when driving shaft 25 is connected to the axles through the gear train comprising gears 19, 31, 33 and 34, while in the embodiment of FIGURES 4 to 6 the worm driving connection is rendered ineffective by increasing the clearance between the worm wheel and worm gear to a point where it is greater than the clearance between gears 33 and 34, in which case the driving connection between shaft 25 and the axles is through the gear train. In both forms of the invention, the teeth of the worm wheel and worm gear are protected by making the angles of the side walls thereof such that when the worm wheel exerts a predetermined degree of pressure against the worm gear, the latter is forced upwardly and out of mesh with said wheel.

What I claim as my invention is:

1. Speed control and braking apparatus for a vehicle having driven axle means and a driving shaft, comprising a first driving connection means including a worm wheel on a normally-driven axle means and a worm gear on a driving shaft and meshing with the worm wheel, the pitch of the worm wheel and gear being such that the wheel cannot drive the gear thereby preventing the axle means from driving the driving shaft, said shaft being adapted to be connected to a motor for rotating the axle means, second driving connection means between the shaft and the axle means of the same driving ratio as the first driving connection means, said second driving connection being adapted to permit the shaft to drive the axle means and vice versa, and means for selectively rendering said preventive action of the worm wheel and gear effective and ineffective.

2. Speed control and braking apparatus as claimed in claim 1 in which the means for selectively rendering the preventive action of the worm wheel and gear effective and ineffective comprises means for selectively breaking and making the second driving connection means between the shaft and the axle means.

3. Speed control and braking apparatus as claimed in claim 1 in which the means for selectively rendering the preventive action of the worm wheel and gear effective and ineffective comprises means for selectively engaging and disengaging said worm wheel and gear.

4. Speed control and braking apparatus for a vehicle having driven axle means and a driving shaft, comprising a worm driving connection including a worm wheel on a normally-driven axle means and a worm gear on a driving shaft and meshing with the worm wheel, the pitch of the worm wheel and gear being such that the wheel cannot drive the gear, thereby preventing the axle means from driving the driving shaft, said shaft being adapted to be connected to a motor for rotating the axle means, a gear train engaging the axle means and the driving shaft and adapted to permit the shaft to drive the axle means and vice versa, said worm driving connection and the gear train being of the same ratio, the speed of rotation of the axle means being governed through the worm driving connection by the speed of rotation of said driving shaft, and means for selectively rendering said preventive action of the worm wheel and gear effective and ineffective whereby the driving connection between the axle means and said shaft when the worm driving means is ineffective is through the gear train.

5. Speed control and braking apparatus as claimed in claim 4 in which the means for selectively rendering said preventive action effective and ineffective comprises means for selectively breaking and making said gear train.

6. Speed control and braking apparatus as claimed in claim 4 in which the means for selectively rendering said preventive action effective and ineffective comprises means for selectively rendering the gear train ineffective and effective.

7. Speed control and braking apparatus as claimed in claim 6 in which the means for selectively rendering the gear train ineffective and effective operates by providing less clearance between the worm wheel and gear than in the gear train, and comprises means to shift the worm gear relative to the worm wheel selectively to increase the clearance between said worm wheel and gear.

8. Speed control and braking apparatus for vehicles having driven axles and driving shafts, comprising a worm driving connection including a worm wheel on a normally-driven vehicle axle and a worm gear on a driving shaft and meshing with the worm wheel, the pitch of the worm wheel and gear being such that the wheel cannot drive the gear, said shaft being adapted to be connected to a motor for rotating the axle, control means normally operable by rotation of the axle to rotate the driving shaft and the worm gear thereon, said driving shaft when being driven turning the axle through the worm driving connection, and said axle on rotation when the shaft is not driven turning said shaft through said control means to turn the worm gear, and means for rendering the control means inoperative whereby the rotation of the axle may be governed by rotation of the driving shaft.

9. Speed control and braking apparatus for vehicles having driven axles and driving shafts, comprising a worm driving connection including a worm wheel on a normally-driven vehicle axle and a worm gear on a driving shaft and meshing with the worm wheel, the pitch of the worm wheel and gear being such that the wheel cannot drive the gear, said shaft being adapted to be connected to a motor for rotating the axle, a gear train engaging the axle and the driving shaft and adapted to permit the shaft to drive the axle and vice versa, said worm driving connection and the gear train being of the same ratio, said driving shaft when being driven turning the axle through the worm driving connection and the gear train, and said axle on rotating when the shaft is not being driven turning said shaft through the gear train to turn the worm gear, and means operatively connected to the gear train for selectively interrupting said train whereby the rotation of the axle may be governed by rotation of the driving shaft.

10. Vehicle speed control and braking apparatus as claimed in claim 9 in which the gear train comprises a gear mounted on the axle, an idler shaft mounted for longitudinal movement substantially parallel with the driving shaft, a pinion fixed on said idler shaft adapted to be moved into and out of mesh with the axle gear by longitudinal movement of the idler shaft, a gear fixed on the idler shaft, and a gear fixed on the driving shaft meshing with said idler shaft gear.

11. Vehicle speed control and braking apparatus as claimed in claim 10 in which the means for interrupting the train comprises means connected to the idler shaft for shifting the latter back and forth to move the pinion thereon into and out of mesh with the axle gear.

12. Speed control and braking apparatus for vehicles having driven axles and driving shafts, comprising a worm driving connection including a worm whel on a normally-driven vehicle axle and a worm gear on a driving shaft and meshing with the worm wheel, the pitch of the worm wheel and gear being such that the wheel cannot drive the gear, thereby preventing the axle from driving the driving shaft through the worm connection, said shaft being adapted to be connected to a motor for rotating the axle, a gear train engaging the axle and the driving shaft and adapted to permit the shaft to drive the axle and vice versa, said worm driving connection and the gear train being of the same ratio, the clearance between the worm gear and worm wheel being less than the gear train, and means for selectively shifting the worm gear away from the worm wheel to increase the clearance therebetween and thereby render the preventive action of the worm gear driving connection ineffective.

13. Speed control and braking apparatus as claimed in claim 1 in which the angles of the sides of the teeth of the worm wheel and worm gear are such that when the wheel exerts a predetermined pressure against the gear the latter is forced out of mesh with the former.

References Cited by the Examiner

UNITED STATES PATENTS

| | | | |
|---|---|---|---|
| 1,000,084 | 8/11 | Frederickson | 74—405 |
| 1,184,121 | 5/16 | Parmeter | 74—427 |
| 2,019,424 | 10/35 | Low | 74—777 |
| 2,163,672 | 6/39 | Ferris | 74—665 |
| 2,903,894 | 9/59 | Legross. | |
| 2,929,268 | 3/60 | Ferro et al. | 74—674 |

DON A. WAITE, *Primary Examiner.*